United States Patent
Hoshina et al.

(10) Patent No.: US 9,312,539 B2
(45) Date of Patent: Apr. 12, 2016

(54) ACTIVE MATERIAL

(75) Inventors: Keigo Hoshina, Yokohama (JP);
Yasuhiro Harada, Yokohama (JP);
Hiroki Inagaki, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 301 days.

(21) Appl. No.: 12/862,080

(22) Filed: Aug. 24, 2010

(65) Prior Publication Data
US 2011/0052993 A1 Mar. 3, 2011

(30) Foreign Application Priority Data
Aug. 25, 2009 (JP) ................. 2009-194545

(51) Int. Cl.
| | |
|---|---|
| H01M 4/13 | (2010.01) |
| H01M 4/485 | (2010.01) |
| C01G 23/00 | (2006.01) |
| C01G 23/047 | (2006.01) |
| H01M 10/0525 | (2010.01) |
| H01M 4/505 | (2010.01) |
| H01M 4/525 | (2010.01) |

(52) U.S. Cl.
CPC ............ H01M 4/485 (2013.01); C01G 23/005 (2013.01); C01G 23/047 (2013.01); H01M 10/0525 (2013.01); C01P 2004/61 (2013.01); C01P 2006/12 (2013.01); C01P 2006/14 (2013.01); C01P 2006/16 (2013.01); C01P 2006/40 (2013.01); H01M 4/505 (2013.01); H01M 4/525 (2013.01); Y02E 60/122 (2013.01)

(58) Field of Classification Search
None
See application file for complete search history.

(56) References Cited

U.S. PATENT DOCUMENTS

| | | | | |
|---|---|---|---|---|
| 2006/0263291 | A1* | 11/2006 | Torardi | 423/608 |
| 2007/0172729 | A1* | 7/2007 | Cho et al. | 429/200 |
| 2007/0292760 | A1* | 12/2007 | Patoux et al. | 429/223 |
| 2009/0038827 | A1* | 2/2009 | Rabinowitz | 174/253 |

FOREIGN PATENT DOCUMENTS

| | | | |
|---|---|---|---|
| EP | 1027924 A1 * | 8/2000 | |
| JP | 2007-18883 | 1/2007 | |
| JP | 2008-117625 | 5/2008 | |
| WO | WO 2006033069 A2 * | 3/2006 | |

OTHER PUBLICATIONS

Wu Yu and Xu Boquing, "Synthesis and characterization of monoclinic $TiO_2$ nanosheets", Chinese Science Bulletin, vol. 50 No. 19, Oct. 2005, pp. 2153-2156.*

Baolong et al., "Preparation and characterization of nanocrystal grain $TiO_2$ porous microspheres", Applied Catalysis B: Environmental 40 (2003) 253-258.*

(Continued)

Primary Examiner — Jonathan Johnson
Assistant Examiner — Anita Nassiri Motlagh
(74) Attorney, Agent, or Firm — Oblon, McClelland, Maier & Neustadt, L.L.P.

(57) ABSTRACT

According to one embodiment, a negative electrode active material includes monoclinic system titanium dioxide having an average pore diameter falling within a range of 8 nm to 25 nm. A volume of pores having a diameter of 10 nm or less falls within a range of 10% to 30% of a total pore volume.

18 Claims, 5 Drawing Sheets

(56) References Cited

OTHER PUBLICATIONS

Barbe et al. (Barbe et al., "Nanocrystalline Titanium Oxide Electrodes for Photovoltaic Applications", Journal of the American Ceramic Society, vol. 80, No. 12, pp. 3157-3171, 1997).*

Lee et al., "Synthesis and Rate Performance of Monolithic Macroporous Carbon Electrodes for Lithium-Ion Secondary Batteries", Advanced Functional Materials, 2005, 15, No. 4, pp. 547-556.*

Jung et al., "Mesoporous TiO2 nano networks: Anode for high power lithium battery applications", Electrochemistry Communications 11 (2009) 756-759.*

Tsutomu Ohzuku, et al. "Electrochemistry of Anatase Titanium Dioxide in Lithium Nonaqueous Cells", Journal of Power Sources, 14, 1985. pp. 153-166.

Rene Marchand, et al. "TiO2 (B) A New Form of Titanium Dioxide and the Potassium Octatitanate $K_2Ti_8O_{17}$", Material Research Bulletin. vol. 15. 1980. pp. 1129-1133.

U.S. Appl. No. 12/850,160, filed Aug. 4, 2010, Inagaki, et al.
U.S. Appl. No. 12/862,118, filed Aug. 24, 2010, Harada, et al.
U.S. Appl. No. 13/053,865, filed Mar. 22, 2011, Inagaki, et al.
U.S. Appl. No. 13/053,913, filed Mar. 22, 2011, Inagaki, et al.

* cited by examiner

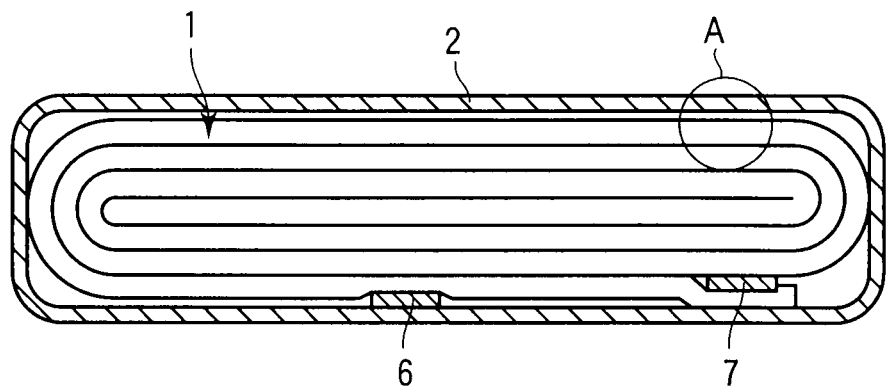
F I G. 1
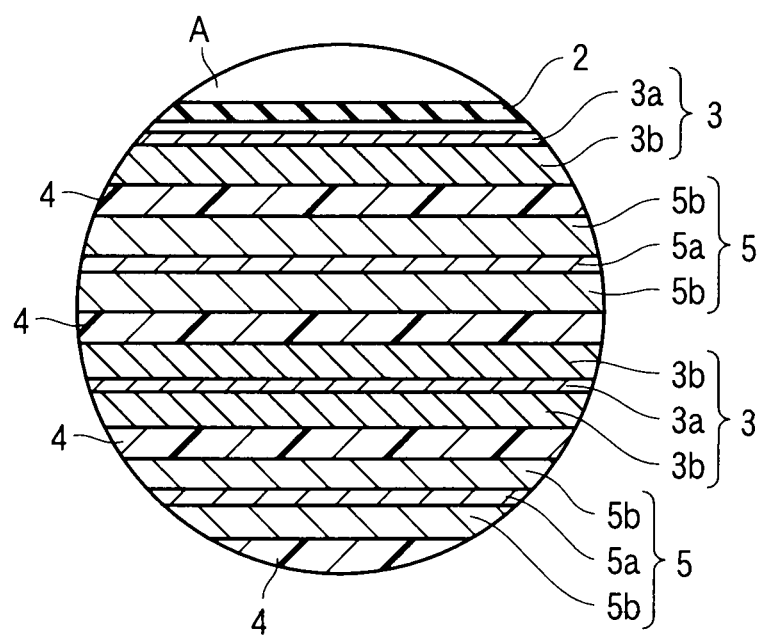
F I G. 2

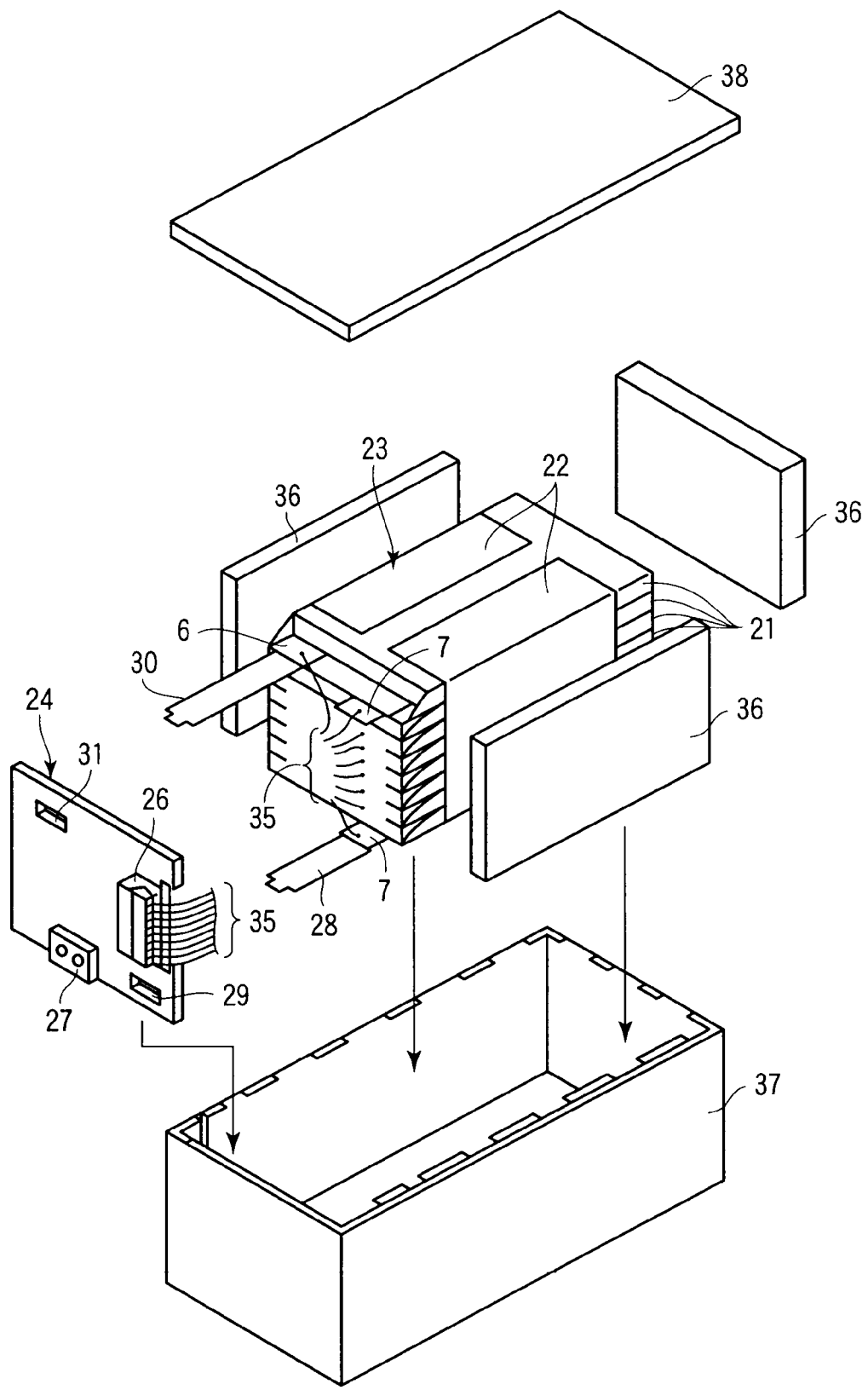
F I G. 5

ACTIVE MATERIAL

CROSS-REFERENCE TO RELATED APPLICATIONS

This application is based upon and claims the benefit of priority from Japanese Patent Application No. 2009-194545, filed Aug. 25, 2009; the entire contents of which are incorporated herein by reference.

FIELD

Embodiments described herein relate generally to a negative electrode active material, nonaqueous electrolyte battery and a battery pack.

BACKGROUND

A nonaqueous electrolyte battery is charged and discharged by the movement of lithium ions between the negative electrode and the positive electrode. Carbonaceous materials are used for the negative electrode active material of the nonaqueous electrolyte battery. Nonaqueous electrolyte batteries using negative electrode active materials having a higher Li inserting and releasing potential than carbonaceous materials have recently been studied and developed. Among these negative electrode active materials, spinel type lithium titanate is a promising negative electrode active material having excellent cycle characteristics and high safety because it is free from a volumetric variation attendant upon a charge-discharge reaction.

A nonaqueous electrolyte battery using a negative electrode active material, for example, spinel type lithium titanate, which has a higher Li inserting and releasing potential than carbonaceous material, has less possibility of the occurrence of lithium dendrite as compared with the case of using a carbonaceous material and therefore has high safety. Also, this spinel type lithium titanate is ceramics and is therefore resistant to thermorunaway.

A nonaqueous electrolyte battery using spinel type lithium titanate (for example, $Li_4Ti_5O_{12}$) as the negative electrode has the problem of a low energy density and therefore, a negative electrode active material having a high capacity is required. In light of this, studies are being made on titanium oxide compounds such as $TiO_2$ (330 mAh/g) having a theoretical capacity per weight higher than that (170 mAh/g) of $Li_4Ti_5O_{12}$ (for example, T. Ohzuku, T. Kodama, T. Hirai, J. Power Sources 1985, 14, 153, R. Marchand, L. Brohan, M. Tournoux, Material Research Bulletin 15, 1129 (1980)).

$TiO_2$ has many crystal structures such as an anatase type and rutile type. Anatase type $TiO_2$ is well known as the battery active material. However, it is considered difficult to develop a high-capacity battery using anatase type $TiO_2$ although anatase type $TiO_2$ has a reversible capacity of about 160 mAh/g which is a high theoretical capacity.

Recently, there has been a report that titanium dioxide having a monoclinic structure which is one of the crystal structures of $TiO_2$ is a promising battery material as a high-capacity negative electrode material (for example, JP-A 2008-117625 (KOKAI)). Titanium dioxide having the monoclinic structure can provide a reversible capacity of about 240 mAh/g and is therefore expected to develop a high capacity.

However, it is necessary that titanium dioxide having the monoclinic structure be micronized to obtain a high reversible capacity. This is accompanied by an increase in specific surface area, leading to a problem concerning a reduction in first cycle Coulomb efficiency.

JP-A 2007-18883 (KOKAI) proposes a method in which lithium-titanium composite oxide particles having an average pore diameter of 50 to 500 Å are used with the intension of improving the large-current characteristics and charge-discharge cycle characteristics of a nonaqueous electrolyte battery. Also, JP-A 2007-18883 (KOKAI) discloses that the energy density of a battery is improved when the volume of pores having a diameter of 10 Å or less in the lithium-titanium composite oxide particles is limited to 0.001 mL/g or more.

BRIEF DESCRIPTION OF THE DRAWINGS

FIG. 1 is a sectional view showing a nonaqueous electrolyte battery according to an embodiment;

FIG. 2 is an enlarged sectional view of the A part of FIG. 1;

FIG. 5 is an exploded perspective view of a battery pack according to an embodiment;

DETAILED DESCRIPTION

Figure 3:
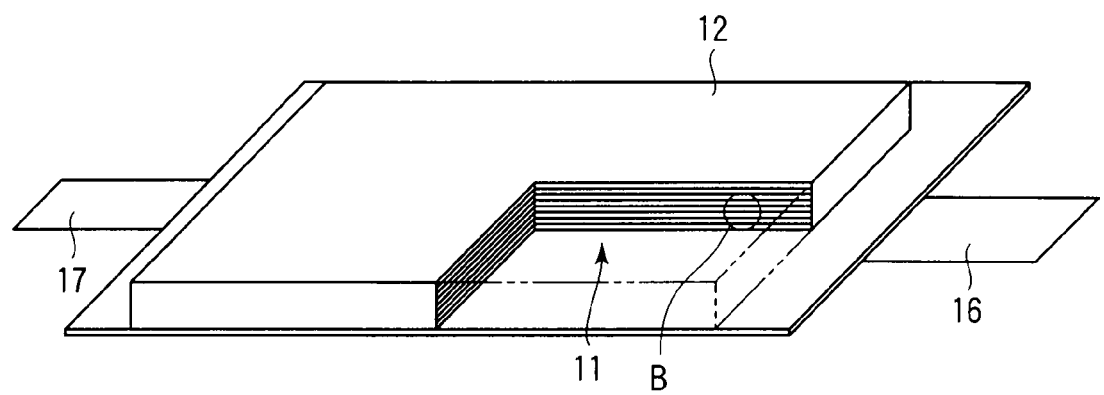
FIG. 3 is a partially broken perspective view schematically showing another nonaqueous electrolyte battery according to an embodiment.

In general, according to one embodiment, a negative electrode active material includes monoclinic system titanium dioxide having an average pore diameter falling within a range of 8 nm to 25 nm. A volume of pores having a diameter of 10 nm or less falls within a range of 10% to 30% of a total pore volume.

A nonaqueous electrolyte battery according to an embodiment includes a negative electrode, a positive electrode and a nonaqueous electrolyte. The negative electrode includes a negative electrode active material containing monoclinic system titanium dioxide having an average pore diameter falling within a range of 8 nm to 25 nm. A volume of pores having a diameter of 10 nm or less falls within a range of 10% to 30% of a total pore volume.

A battery pack according to an embodiment includes the nonaqueous electrolyte battery.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

(First embodiment)

A negative electrode active material according to a first embodiment contains monoclinic system titanium dioxide which has an average pore diameter falling within a range of 8 nm to 25 nm. 10% to 30% of the total pore volume is occupied by the volume of pores having a diameter of 10 nm or less.

The crystal structure of monoclinic system titanium dioxide belongs preferably to a space group C2/m and has a tunnel structure. With regard to the detailed crystal structure of monoclinic system titanium dioxide, those described in R. Marchand, L. Brohan, M. Tournoux, Material Research Bulletin 15, 1129 (1980) will be described. The crystal structure of monoclinic system titanium dioxide is desirably a monoclinic system β-type structure. Hereinafter, monoclinic system titanium dioxide is referred to as "$TiO_2$ (B)".

$TiO_2$ (B) may have less crystallinity and therefore, there are some samples having the feature that the peak on the X-ray diffraction graph in powder X-ray measurement has low intensity and is scarcely observed.

When the average pore diameter of $TiO_2$ (B) is less than 8 nm, the ratio of the specific surface area to the volume of pores is excessive and therefore, the amount of the nonaqueous electrolyte to be subjected to decomposition reaction is increased at the boundary between the electrode and the nonaqueous electrolyte. Also, when the average pore diameter exceeds 25 nm, the powder strength of the negative electrode active material is decreased and there is therefore a fear as to the collapse of the negative electrode active material when the electrode has a high density. The average pore diameter falls preferably within a range of 10 nm to 20 nm.

If the volume of pores having a diameter of 10 nm or less in $TiO_2$ (B) is less than 10% of the total pore volume, a high discharge capacity is not obtained because the lithium-diffusibility of $TiO_2$ (B) is not improved. When the volume exceeds 30% of the total pore volume, on the other hand, a film is formed on the electrode by the decomposition reaction of the nonaqueous electrolyte and therefore, the first cycle Coulomb efficiency is decreased. When the average pore diameter falls within a range of 8 nm to 25 nm and the volume of pores having a diameter of 10 nm or less falls within a range of 10% to 30% of the total pore volume, $TiO_2$ (B) can be sufficiently brought into contact with the nonaqueous electrolyte without excessively increasing the specific surface area of $TiO_2$ (B), making it easy to proceed with a charge-discharge reaction, which ensures that a high capacity can be obtained and also, high first cycle Coulomb efficiency can be obtained.

Because microparticles of lithium titanate and anatase type $TiO_2$ described in JP-A 2007-18883 have higher lithium-diffusibility than $TiO_2$ (B), the substantially chargeable and dischargeable capacity and high first cycle Coulomb efficiency can be attained even if the average pore diameter and the percentage of the volume of pores having a diameter of 10 nm or less are not controlled in the above ranges. As shown in the examples which will be explained later, lithium titanate and anatase type $TiO_2$ are not expected to be improved in reversible capacity, even if the average pore diameter and the percentage of the volume of pores having a diameter of 10 nm or less are controlled in the above ranges. In fact, there is no description concerning the percentage of the volume of pores having a diameter of 10 nm or less in JP-A 2007-18883. The fact that $TiO_2$ (B) is improved in reversible capacity and first cycle Coulomb efficiency when the average pore diameter and the percentage of the volume of pores having a diameter of 10 nm or less are in the above ranges was found by the present inventors for the first time, and these effects cannot be foreseen from any of JP-A 2008-117625 (KOKAI) and JP-A 2007-18883 (KOKAI).

The total pore volume is preferably 0.02 $cm^3/g$ or more. This ensures a sufficient reversible capacity. The volume is preferably 0.1 $cm^3/g$ or more. Also, the upper limit of the total pore volume is preferably 0.2 $cm^3/g$ to obtain a high first cycle Coulomb efficiency. The total pore volume falls more preferably within a range of 0.1 $cm^3/g$ to 0.2 $cm^3/g$.

The specific surface area of $TiO_2$ (B) falls preferably within a range of 5 $m^2/g$ to 100 $m^2/g$. Sufficient sites for insertion and release of lithium ions can be secured and a high capacity can be obtained when the specific surface area is designed to be 5 $m^2/g$ or more. Also, the first cycle Coulomb efficiency in the charge-discharge operation can be improved when the specific surface area is designed to be 100 $m^2/g$ or less.

Examples of the $TiO_2$ (B) particles include particles having pores and needle crystals, fiber crystals or plate crystals and crystal aggregates having needle crystals, fiber crystals or plate crystals or combinations of these crystals. In this case, gaps between crystals existing in the aggregate are pores.

The average particle diameter of $TiO_2$ (B) falls preferably within a range of 1 μm to 10 μm. Here, the average particle diameter is given by D50 in the particle diameter distribution. D50 is a value of accumulation 50% in the particle diameter distribution. Also, one form of $TiO_2$ (B) having an average particle diameter falling in the above range is secondary particles which are an aggregate of primary particles having a diameter of about 100 to 200 nm. When the primary particles are plate or needle particles, the short axis of the primary particle is preferably about 100 to 200 nm in length.

An example of a method of producing $TiO_2$ (B) will be explained.

$K_2Ti_4O_9$ which is a raw material of $TiO_2$ (B) is prepared. Besides the above material, compounds represented by $A_2Ti_xO_{2x+1}$ (A is Na, K or the like, $1 \leq x \leq 8$), for example, $Na_2Ti_3O_7$, $K_2Ti_6O_{13}$ and $Cs_2Ti_5O_{13}$ or the like may be used as the raw material.

$K_2Ti_4O_9$ prepared as the raw material is thoroughly washed with water to remove impurities from the raw material. Then, the raw material is subjected to acid treatment to exchange potassium for a proton. When $Na_2Ti_3O_7$ or $Cs_2Ti_5O_{13}$ is used as the raw material, sodium or cesium is exchanged for a proton after the raw material is washed with water.

As the acid used in the acid treatment of $K_2Ti_4O_9$ which has been washed with water, hydrochloric acid, nitric acid, sulfuric acid or the like may be used in a concentration of 0.5 to 2 M. Though no particular limitation is imposed on the acid treatment temperature and acid treatment time, the temperature may be designed to be about 10 to 80° C. and the acid treatment time may be designed to be about 1 hour to 14 days.

The acid treatment is desirably carried out until the proton exchange is completely finished. If alkali cations contained in the raw material remain, charge-discharge characteristics were deteriorated. Also, an alkaline solution such as an aqueous lithium hydroxide solution may be added to neutralize the acid left unremoved when the proton exchange is finished.

After the proton exchange, the proton exchanged body is dried to thereby obtain a $TiO_2$ (B) precursor. The obtained $TiO_2$ (B) precursor is subjected to heat treatment to thereby obtain $TiO_2$ (B) which is a final target product. The heat treatment temperature is preferably in the range of 300° C. to 600° C. When the temperature is less than 300° C., significantly low crystallinity is obtained, leading to deteriorated charge-discharge characteristics. If the temperature exceeds 600° C., deteriorated charge-discharge characteristics are obtained as well. The heat treatment time may be designed to be about 1 to 10 hours though no particular limitation is imposed on it.

Besides the above method, as to the method of synthesizing $TiO_2$, a $TiO_2$ (B) precursor may be synthesized by the hydrothermal synthesis, followed by heat treatment to obtain $TiO_2$ (B) which is a final target product. $TiO_2$ (B) may contain 1000 ppm by weight or less of impurities unavoidable in the production.

Next, the control of pores of $TiO_2$ (B) will be explained.

Pores of $TiO_2$ (B) can be controlled by adjusting the shape of particles of the raw material, conditions in the acid treatment and condition of the hydrothermal synthetic method. For example, as to the shape of particles, plate or needle particles are more preferably used than undefined particles. These plate or needle particles are scarcely increased excessively the specific surface area per unit pore volume. With regard to the condition of the acid treatment, the treatment temperature is preferably in the range of about 40° C. to 70° C. though the acid treatment may be carried out at a temperature falling within a range of about 10° C. to 80° C. The time required for the acid treatment is preferably in the range of about 1 to 24 hours though the acid treatment may be carried out for a time falling within the range of 1 hour to 14 days.

As shown in $TiO_2$ (B) of the embodiment, pores enabling a charge-discharge reaction can be controlled without excessively increasing the specific surface area by carrying out acid treatment at a temperature falling within a range of about 40° C. to 70° C. which is a higher temperature than in the case of the known acid treatment for a time falling within the range of about 1 to 24 hours which is shorter than the known acid treatment time. This is inferred that eroded points are increased by the acid treatment carried out at high temperatures in a short time and therefore, the reaction proceeds to the inside of particles in a short time.

Here, the methods of measuring the average pore diameter, pore volume or pore distribution will be explained. As these methods of measuring the average pore diameter, pore volume or pore distribution, there are the nitrogen gas adsorption method, mercury porosimetry, X-ray small-angle scattering method or the like. The nitrogen gas adsorption method is preferable to measure pores having a diameter of about 10 nm with high accuracy.

The average pore diameter, pore volume or pore distribution of $TiO_2$ (B) may be measured by the nitrogen gas adsorption method. For example, Shimadzu Micromeritics ASAP-2010 (nitrogen gas adsorption, pore distribution/specific surface area measurement) may be used as the measuring device. A $TiO_2$ (B) sample is filled in a measuring cell and subjected to a degassing treatment. Then, the measurement is performed.

As the analysis method used to calculate the average pore diameter, pore distribution and pore volume, the BJH method is used. The average pore diameter means a value obtained by dividing a volume four times the pore volume by the surface area. Pores in the sample are assumed to have a cylinder form and the volume of this cylinder type pore is defined as a volume V. At this time, the volume of the cylinder type pore is given by the following equation (1)

$$V = \pi D^2 L/4 \quad (1)$$

Here, D is a pore diameter and L is the length of the cylinder type pore. Next, the side surface area A of the cylinder type pore is given by the following equation (2).

$$A = \pi DL \quad (2)$$

The following equation (3) is obtained from the above equations (1) and (2).

$$D = 4 V/A \quad (3)$$

D calculated from the above equation (3) is defined as the average pore diameter.

With regard to the total pore volume, the accumulated value of pores obtained from the results of pore distribution measured by the BJH method in a pore diameter range of 1 nm to 100 nm is defined as the total pore volume. The pore distribution is given by the relation between the pore diameter and the accumulated pore volume. The percentage of the volume of pores having a diameter of 10 nm or less is calculated from the ratio of the accumulated pore volume of pores having a diameter of 10 nm or less to the total pore volume.

The average pore diameter, pore distribution and pore volume of $TiO_2$ (B) contained in the electrode are measured after extracting only $TiO_2$ (B) from the electrode. When, for example, a conductive agent such as carbon and a polymer such as a high-molecular material are contained in the electrode, a layer containing $TiO_2$ (B) is peeled from the current collector and the high-molecular material is removed by the Soxhlet extraction method, whereby $TiO_2$ (B) and the carbon material can be extracted. When NMP is used as the solvent in the Soxhlet method, the high-molecular material can be removed from the electrode. Only $TiO_2$ (B) can be extracted from the mixture of $TiO_2$ (B) and carbon material obtained by the Soxhlet method, by oxidizing the carbon material by oxygen or ozone to remove the carbon material as carbon dioxide. The above method enables the measurement of the average pore diameter, pore distribution and pore volume in the case of $TiO_2$ (B) contained in the electrode.

(Second embodiment)

A nonaqueous electrolyte battery according to a second embodiment comprises a positive electrode, a negative electrode containing the negative electrode active material according to the first embodiment and a nonaqueous electrolyte.

The negative electrode, nonaqueous electrolyte and positive electrode will be explained in detail below.

1) Negative Electrode

The negative electrode comprises a negative electrode current collector and a negative electrode layer which is carried on one or both surfaces of the negative electrode current collector and contains the negative electrode active material according to the first embodiment, a negative electrode conductive agent and a binder.

A negative electrode conductive agent is used to improve current-collecting characteristics and to restrain the contact resistance with the current collector. Examples of the negative electrode conductive agent include acetylene black, carbon black and graphite.

A binder is used to bind the negative electrode active material with the negative electrode conductive agent Examples of the binder include polytetrafluoroethylene (PTFE), polyvinylidene fluoride (PVdF), fluoro-rubber and styrene-butadiene rubber.

With regard to the ratios of the negative electrode active material, negative electrode conductive agent and binder, the amount of the negative electrode active material is preferably in the range of 70% by weight to 96% by weight, the amount of the negative electrode conductive agent is preferably in the range of 2% by weight to 28% by weight and the amount of the binder is preferably in the range of 2% by weight to 28% by weight. When the amount of the negative electrode conductive agent is 2% by weight or more, the current-collecting performance of the negative electrode layer is improved and the large-current characteristics of the nonaqueous electrolyte secondary battery are improved. Also, when the amount of the binder is 2% by weight or more, the binding characteristics between the negative electrode layer and the negative electrode current collector are improved, leading to improved cycle characteristics. On the other hand, the amounts of the negative electrode conductive agent and binder are respectively preferably 28% by weight or less from the viewpoint of obtaining a high capacity.

As the negative electrode current collector, preferable materials include aluminum foils and aluminum alloy foils containing elements such as Mg, Ti, Zn, Mn, Fe, Cu and Si, which are electrochemically stable in a potential range nobler than 1.0 V.

2) Nonaqueous Electrolyte

Examples of the nonaqueous electrolyte include liquid nonaqueous electrolytes prepared by dissolving an electrolyte in an organic solvent and gel-like nonaqueous electrolytes obtained by composing a liquid electrolyte with a polymer.

The liquid nonaqueous electrolyte is prepared by dissolving an electrolyte in an organic solvent in a concentration range of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], and mixtures of these compounds. The electrolyte is preferably one which is scarcely oxidized even at a high potential and $LiPF_6$ is most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoxyethane (DEE), γ-butyrolactone (GBL), acetonitrile (AN) and sulfolan (SL), which may be used either singly or in combination of two or more.

Examples of the polymer include polyvinylidene fluoride (PVdF), polyacrylonitrile (PAN) and polyethylene oxide (PEO).

3) Positive Electrode

The positive electrode comprises a positive electrode current collector and a positive electrode layer which is formed on one or both surfaces of the current collector and contains a positive electrode active material, a conductive agent and a binder.

Examples of the positive electrode active material include oxides and sulfides. Examples of the oxides include those having a layer structure such as lithium-cobalt composite oxide (for example, $Li_xCoO_2$), lithium-nickel-cobalt composite oxide (for example, $Li_xNi_{1-y}Co_yO_2$), lithium-nickel-manganese composite oxide (for example, $Li_xNi_{1-y}Mn_yO_2$) and lithium-nickel-cobalt-manganese composite oxide (for example, $Li_xNi_{1-y-z}Co_yMn_zO_2$), those having a spinel structure such as lithium-manganese composite oxide (for example, $Li_xMn_2O_4$) and lithium-manganese-nickel composite oxide ($Li_xMn_{2-y}Ni_yO_4$), and those having an olivine structure such as lithium-phosphorous oxide (for example, $Li_xFePO_4$, $Li_xFe_{1-y}Mn_yPO_4$, $Li_xCoPO_4$).

Preferable examples of the positive electrode active material having a layer structure include lithium-nickel composite oxide (for example, $Li_xNiO_2$), lithium-cobalt composite oxide ($Li_xCoO_2$), lithium-nickel-cobalt composite oxide (for example, $Li_xNi_{1-y}Co_yO_2$) and lithium-nickel-cobalt-manganese composite oxide (for example, $Li_xNi_{1-y-z}Co_yMn_zO_2$).

Preferable examples of lithium compounds having a spinel structure include lithium-manganese-nickel composite oxide (for example, $Li_xMn_{2-y}Ni_yO_4$) and lithium-manganese composite oxide (for example, $Li_xMn_2O_4$).

Preferable examples of lithium compounds having an olivine structure include lithium-iron phosphate (for example, $Li_xFePO_4$) and lithium-manganese-iron phosphate compounds (for example, $Li_xFe_{1-y}Mn_yPO_4$). Here, each value of x, y and z is preferably in the range of 0 to 1. The positive electrode active materials may be used alone or as a mixture of two or more kinds.

The specific surface area of the positive electrode active material is preferably in the range of 0.1 $m^2$/g to 10 $m^2$/g. When the specific surface area of the positive electrode active material is 0.1 $m^2$/g or more, ample sites for inserting and releasing of lithium ions can be secured. When this specific surface area is 10 $m^2$/g or less, the positive electrode active material is easily handled in industrial production and good charge-discharge cycle characteristics can be secured.

A positive electrode conductive agent is used to improve current-collecting characteristics and to restrain the contact resistance with the current collector. Examples of the positive electrode conductive agent include carbonaceous materials such as acetylene black, carbon black and graphite.

A binder is used to bind the positive electrode active material with the positive electrode conductive agent. Examples of the binder include polytetrafluoroethylene (PTFE), polyvinylidene fluoride (PVdF) and fluoro-rubber.

The ratios of the positive electrode active material, positive electrode conductive agent and binder to be formulated are preferably in the range of 80% by weight to 95% by weight, in the range of 3% by weight to 18% by weight and in the range of 2% by weight to 17% by weight, respectively. As to the binder, sufficient electrode strength is obtained when the amount of the binder is 2% by weight or more and the amount of the insulating material in the electrode is reduced and the internal resistance can be decreased when the amount of the binder is 17% by weight or less.

As the positive electrode current collector, an aluminum foil or an aluminum alloy foil containing elements such as Mg, Ti, Zn, Mn, Fe, Cu and Si is preferable.

The positive electrode is manufactured by, for example, suspending the positive electrode active material, positive electrode conductive agent and binder in an appropriate solvent, applying the obtained slurry to the positive electrode current collector, and drying the slurry to form a positive electrode layer on the positive electrode current collector, followed by pressing. Alternatively, the positive electrode active material, positive electrode conductive agent and binder may be made into a pellet form, which is used for the positive electrode layer.

Next, the nonaqueous electrolyte battery according to the second embodiment will be explained in more detail with reference to FIGS. 1 and 2. FIG. 1 is a sectional view of the flat type nonaqueous electrolyte battery according to the second embodiment and FIG. 2 is an enlarged sectional view of the A part of FIG. 1.

A wound electrode group 1 having a flat form is received in a baggy container 2 made of a laminate film obtained by interposing a metal foil between two resin films. The wound electrode group 1 having a flat form is formed by spirally winding a laminate obtained by laminating a negative electrode 3, a separator 4, a positive electrode 5 and a separator 4 in this order from the outside and by press-molding the wound laminate. The outermost negative electrode 3 has a structure in which, as shown in FIG. 2, a negative electrode layer 3b containing the negative electrode active material of the first embodiment is formed on one of the inside surfaces of a negative electrode current collector 3a. Other negative electrodes 3 each have a structure in which a negative electrode layer 3b is formed on each surface of the negative electrode current collector 3a. The positive electrode 5 has a structure comprising a positive electrode layer 5b on each surface of a positive electrode current collector 5a.

In the vicinity of the outer peripheral end of the wound electrode group 1, a negative electrode terminal 6 is connected to the negative electrode current collector 3a of the outermost negative electrode 3. A positive electrode terminal 7 is connected to the positive electrode current collector 5a of the inside positive electrode 5. These negative electrode terminal 6 and positive electrode terminal 7 are externally extended from an opening part of the baggy container 2. A liquid nonaqueous electrolyte is, for example, injected from the opening part of the baggy container 2. The opening part of the baggy container 2 is closed by heat sealing with the negative electrode terminal 6 and positive electrode terminal 7 caught in the opening part to thereby seal the wound electrode group 1 and liquid nonaqueous electrolyte.

Figure 4:
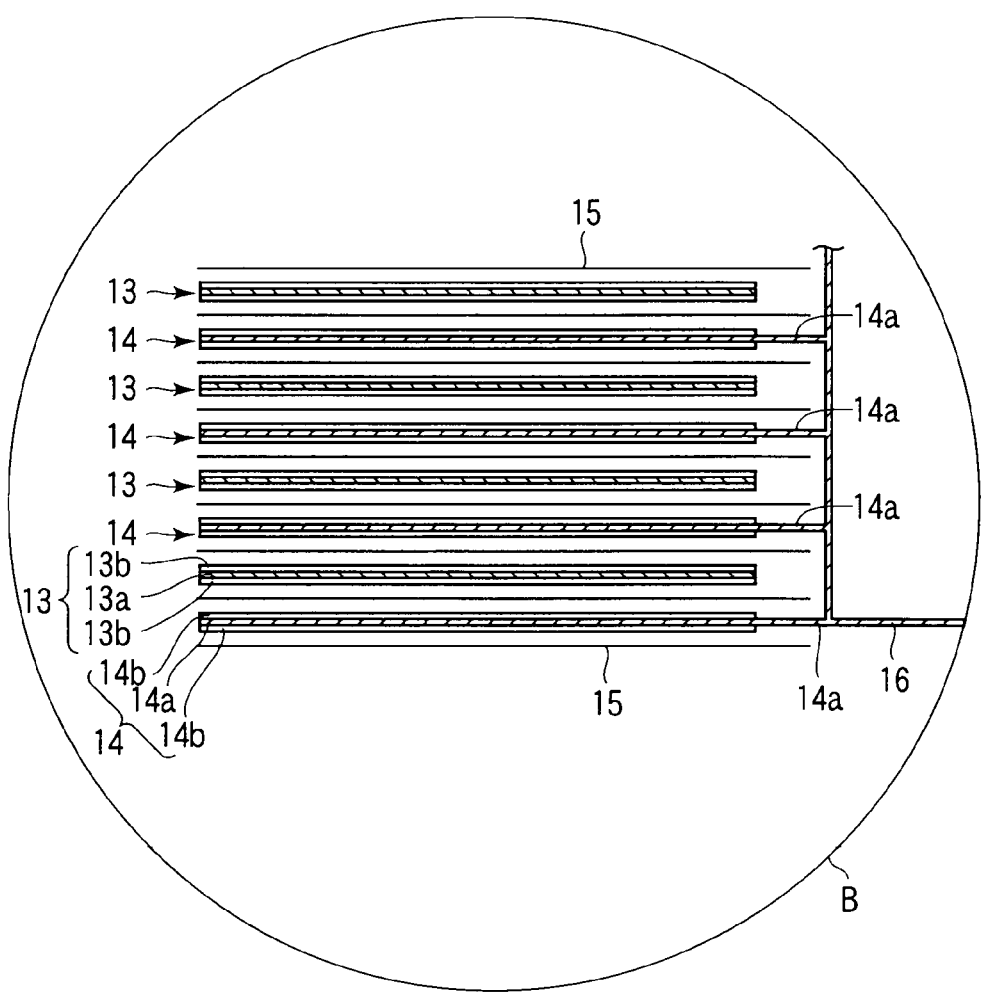
FIG. 4 is an enlarged sectional view of the B part of FIG. 3.

The nonaqueous electrolyte battery according to the second embodiment is not limited to the structure shown in FIGS. 1 and 2, and may have, for example, the structure shown in FIGS. 3 and 4. FIG. 3 is a partially broken perspective view schematically showing another flat type nonaqueous electrolyte battery according to the second embodiment and FIG. 4 is an enlarged sectional view of the B part shown in FIG. 3.

A laminate type electrode group 11 is received in a container 12 made of a laminate film obtained by interposing a metal layer between two resin films. The laminate type electrode group 11 has a structure in which, as shown in FIG. 4, a positive electrode 13 and a negative electrode 14 are alternately laminated on each other with a separator 15 interposed therebetween. Plural positive electrodes 13 exist and each comprise a current collector 13a and a positive electrode layer 13b carried on both surfaces of the current collector 13a. Plural negative electrodes 14 exist and each comprise a current collector 14a and a negative electrode layer 14b carried on both surfaces of the current collector 14a. One side of the current collector 14a of each negative electrode 14 is projected from the positive electrode 13. The projected current collector 14a is electrically connected to a band-like negative electrode terminal 16. The tip of the band-like negative electrode terminal 16 is extended externally from the container 12. Also, though not shown in the drawings, the current collector 13a of the positive electrode 13 is projected from the negative electrode 14 on the side positioned opposite to the projected side of the current collector 14a. The current collector 13a projected from the negative electrode 14 is electrically connected to the band-like positive electrode terminal 17. The tip of the band-like positive electrode terminal 17 is positioned on the side opposite to the negative electrode terminal 16 and externally extended from the side of the container 12.

The separator, the positive and negative electrode terminals and the container will be explained below.

Examples of the separator may include porous films containing polyethylene, polypropylene, cellulose or polyvinylidene fluoride (PVdF) and nonwoven fabrics made of synthetic resins. Among these materials, porous films made of polyethylene or polypropylene are melted at a fixed temperature, making it possible to shut off current and are therefore desirable from the viewpoint of improving safety.

The negative electrode terminal is made of, for example, a material having electric stability and conductivity in a potential range of 1.0 V to 3.0 V with respect to a lithium metal. Specific examples of the material for the negative electrode terminal include aluminum and aluminum alloys containing elements such as Mg, Ti, Zn, Mn, Fe, Cu and Si. The negative electrode terminal is preferably made of the same material as the negative electrode current collector to reduce the contact resistance.

The positive electrode terminal is made of, for example, a material having electric stability and conductivity in a potential range of 3.0 V to 4.5 V with respect to a lithium metal. Specific examples of the material for the positive electrode terminal include aluminum and aluminum alloys containing elements such as Mg, Ti, Zn, Mn, Fe, Cu and Si. The positive electrode terminal is preferably made of the same material as the positive electrode current collector to reduce the contact resistance.

The laminate film used for the container is not limited to the above material obtained by interposing a metal layer between two resin films, but a multilayer film made of a metal layer and a resin layer coating the metal layer may be used as the laminate film. The metal layer is preferably an aluminum foil or aluminum alloy foil for light-weight characteristics. The resin layer is used to reinforce the metal layer and a polymer material may be used. Examples of the polymer material include polypropylene (PP), polyethylene (PE), nylon and polyethylene terephthalate (PET). The laminate film is molded by heat sealing.

The laminate film preferably has a thickness of 0.2 mm or less.

Examples of the container include metal containers having a wall thickness of 0.5 mm or less besides those made of a laminate film. The wall thickness of the metal container is more preferably 0.2 mm or less. Examples of the metals to be used for the metal container include aluminum and an aluminum alloy. As the aluminum alloy, aluminum alloys containing elements such as magnesium, zinc and silicon are preferable. On the other hand, the content of transition metals such as iron, copper, nickel and chromium is preferably 100 wt-ppm or less.

Examples of the shape of the battery include a flat form, angular form, cylinder form, coin form, button form, sheet form and laminate form. Of course, the battery of the embodiments may be applied to, besides small batteries to be mounted on portable electronic devices, large batteries to be mounted on two- to four-wheel vehicles and the like.

(Third embodiment)

A battery pack according to a third embodiment contains one or two or more nonaqueous electrolyte batteries (unit cells) according to the second embodiment. When plural unit cells are contained, these unit cells are electrically connected in series or in parallel.

Next, the battery pack according to this embodiment will be explained in detail with reference to FIGS. 5 and 6. The flat-type nonaqueous electrolyte battery shown in FIG. 1 may be used as the unit cell.

Plural unit cells 21 each constituted of the flat type nonaqueous electrolyte battery shown in FIG. 1 are laminated such that the externally extended negative electrode terminal 6 and positive electrode terminal 7 are arranged in the same direction and fastened with an adhesive tape 22 to thereby constitute a battery module 23. These unit cells 21 are electrically connected in series as shown in FIG. 6.

A printed wiring board 24 is disposed and faces the side surface of the unit cell 21 from which the negative electrode terminal 6 and positive electrode terminal 7 are extended. As shown in FIG. 6, a thermistor 25, a protective circuit 26 and an energizing terminal 27 connected to external devices are mounted on the printed wiring board 24. An insulating plate (not shown) is attached to the surface of the printed wiring board 24 facing the battery module 23 to avoid unnecessary connection with the wiring of the battery module 23.

A positive electrode lead 28 is connected to the positive electrode terminal 7 positioned on the lowermost layer of the battery module 23 and the tip of the positive electrode lead 28 is inserted into and electrically connected to a positive electrode connector 29 of the printed wiring board 24. A negative electrode lead 30 is connected to the negative electrode terminal 6 positioned on the uppermost layer of the battery module 23 and the tip of the negative electrode lead 30 is inserted into and electrically connected to a negative electrode connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21 and the detected signals are transmitted to the protective circuit 26. The protective circuit 26 can shut off a plus wiring 34a and a minus wiring 34b between the protective circuit 26 and the energizing terminal 27 under a predetermined condition. The predetermined condition means, for example, the case where the temperature detected by the thermistor 25 is above a predetermined one. Also, the predetermined condition means, for example, the case of detecting over-charge, over-discharge and over-current of the unit cell 21. The detection of the over-charge and the like is made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 5 and 6, a wiring 35 for detecting voltage is connected to each unit cell 21 and the detected signals are transmitted to the protective circuit 26 through these wirings 35.

A protective sheet 36 made of rubber or resin is disposed on each of the three side surfaces of the battery module 23 excluding the side surface from which the positive electrode terminal 7 and negative electrode terminal 6 are projected.

The battery module 23 is received in a receiving case 37 together with each protective sheet 36 and printed wiring board 24. Specifically, the protective sheet 36 is disposed on each inside surface in the direction of the long side and on one of the inside surfaces in the direction of the short side of the receiving case 37, and the printed wiring board 24 is disposed on the other inside surface in the direction of the short side. The battery module 23 is positioned in a space enclosed by the protective sheets 36 and the printed wiring board 24. A lid 38 is attached to the upper surface of the receiving case 37.

Here, a heat-shrinkable tape may be used in place of the adhesive tape 22 to secure the battery module 23. In this case, after the protective sheet is disposed on both sides of the battery module and the heat-shrinkable tape is wound around the battery module, the heat-shrinkable tape is thermally shrunk to fasten the battery module.

Figure 6:
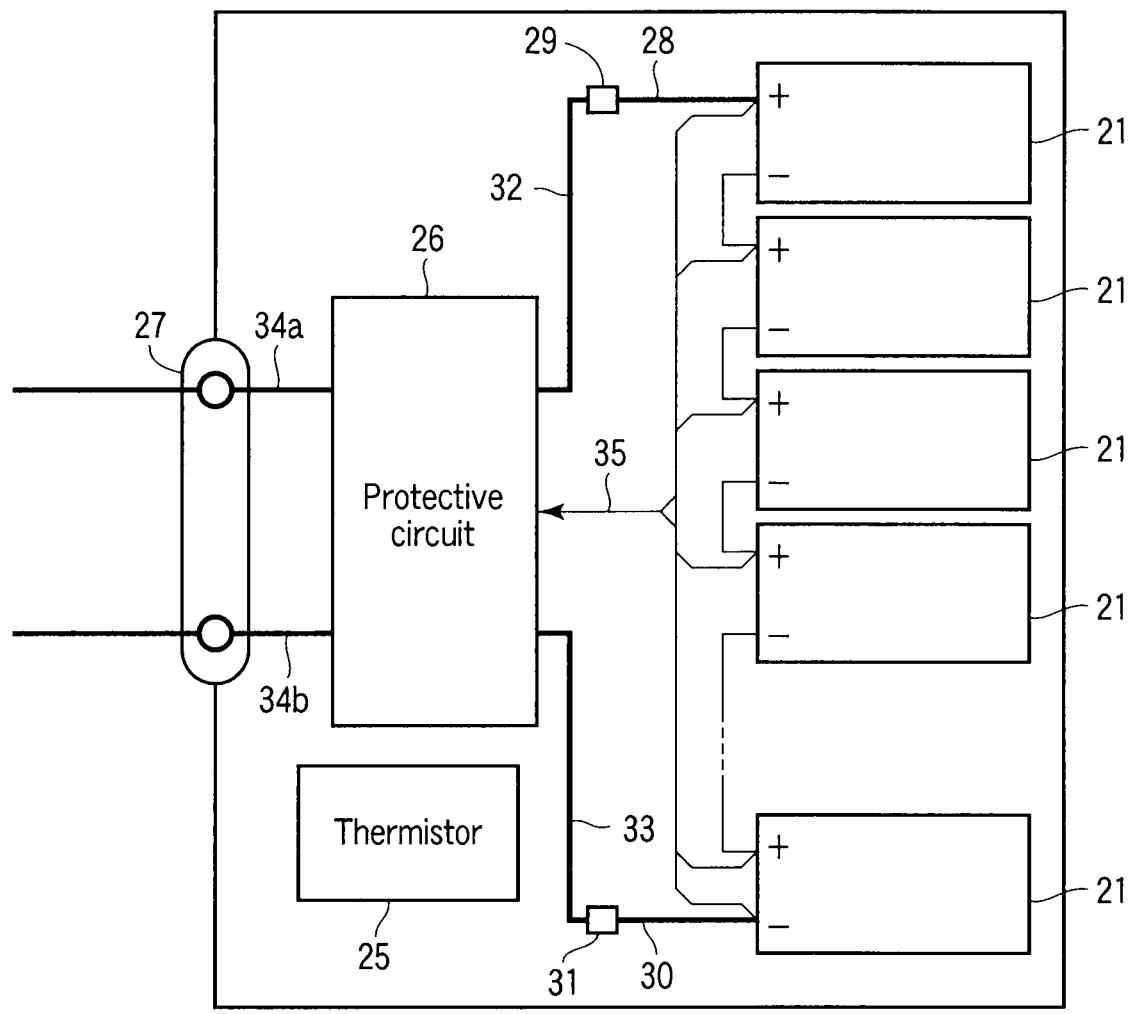
FIG. 6 is a block diagram showing an electric circuit of the battery pack of FIG. 5.

The structure in which the unit cells 21 are connected in series is shown in FIGS. 5 and 6. However, these unit cells 21 may be connected in parallel to increase the battery capacity. The assembled battery packs may be connected in series or in parallel.

Also, the aspect of the battery pack is appropriately changed according to its use. The battery pack is preferably used in applications requiring excellent large-current cycle characteristics. Specific examples of these applications include power sources for digital cameras, and power sources mounted on vehicles such as two- to four-wheel hybrid electric vehicles, two- to four-wheel electric vehicles and electric mopeds. The battery pack is preferably used for power sources mounted on vehicles.

EXAMPLES

The embodiments will be explained in more detail by way of examples. However, the embodiments are not limited to the following examples within the scope of the embodiments.

Example 1

Using a negative electrode containing, as a negative electrode active material, $TiO_2$ (B) having the characteristics that the average pore diameter was 14.6 nm, the volume of pores having a pore diameter of 10 nm or less was 17.5% of the total pore volume, the total pore volume was 0.122 $cm^3/g$ and the specific surface area was 33.5 $m^2/g$, a charge-discharge test was conducted at a current density of 20 mA/g under an environment of 25° C.

The method of producing $TiO_2$ (B) in Example 1 is as follows. $K_2Ti_4O_9$ particles having a plate form were prepared as the raw material of $TiO_2$ (B). It was estimated from the results of SEM observation that the particle size was as follows: short axis length: about 10 to 20 μm, long axis length: about 10 to 30 μm and thickness: 5 to 10 μm.

$K_2Ti_4O_9$ which was the raw material was thoroughly washed with water to remove impurities from the raw material. Then, the raw material was subjected to acid treatment to exchange potassium for a proton.

In the acid treatment of $K_2Ti_4O_9$ washed with water, 1 M of hydrochloric acid was used and the acid treatment was carried out at a temperature of 25° C. Also, the time required for the acid treatment was 14 days.

The proton-exchanged material obtained after the proton exchange was dried to obtain a $TiO_2$ (B) precursor. The obtained $TiO_2$ (B) precursor was heat-treated at 350° C. for one hour to obtain $TiO_2$ (B) which was a final target product.

The final target product $TiO_2$ (B) was observed by SEM, to find that the plate shape of the raw material was maintained after the proton exchange and heat treatment. Although the particles maintained a plate shape, many voids were observed. It is inferred that voids were formed by the acid treatment.

Though the acid treatment time is usually about several hours to one day, the acid treatment time for Example 1 was 14 days. The proton exchange can be sufficiently achieved and fine pores can be formed in the plate $K_2Ti_4O_9$ particles under such a severe condition of acid treatment as mentioned above. At this time, if appropriate conditions are selected as the particle shape and as the condition of acid treatment, fine pores can be formed in a proper amount without excessively increasing the specific surface area.

<Production of an Evaluation Cell>

In dry argon atmosphere, the negative electrode containing $TiO_2$ (B) was made to be opposite to a Li metal which was a counter electrode, through a glass filter (separator) and a lithium metal was inserted as a reference electrode so as not to be in contact with the negative electrode and counter electrode Li metal. These members were put in a triple-pole glass cell, and the negative electrode, counter electrode and reference electrode were respectively connected to a terminal of the glass cell. Then, an electrolytic solution was poured to impregnate the separator and the electrodes sufficiently with the electrolytic solution, and under this condition, the glass container was closed tightly. As the electrolytic solution, one obtained by dissolving 1.0 mol/L of $LiPF_6$ as an electrolyte in a mixed solvent prepared by blending ethylene carbonate (EC) with diethyl carbonate (DEC) in a ratio by volume of 1:2 was used.

<Glass Cell Charge-Discharge Test>

Using the manufactured cell, a charge-discharge test was conducted under an environment of 25° C. The charge rate and discharge rate were respectively set to 20 mA/g and the voltage was set in the range of 1.0 to 3.0 V. At this time, the first cycle Coulomb efficiency was observed.

Example 2

$TiO_2$ (B) was manufactured under the same conditions as in Example 1 except that 2 M hydrochloric acid was used for the acid treatment of $K_2Ti_4O_9$ washed with water, the acid treatment temperature was altered to 70° C. and the acid treatment time was altered to 6 hours. The obtained $TiO_2$ (B) had the following characteristics: the average pore diameter was 12.34 nm, the volume of pores having a diameter of 10 nm or less was 22.9% of the total pore volume, the total pore volume was 0.0991 cm³/g and the specific surface area was 32.1 m²/g. Using a negative electrode containing $TiO_2$ (B) obtained in this manner as the negative electrode active material, a charge-discharge test was conducted under an environment of 25° C. at a current density of 20 mA/g.

Example 3

Using a negative electrode containing, as a negative electrode active material, $TiO_2$ (B) having the characteristics that the average pore diameter was 17.72 nm, the volume of pores having a pore diameter of 10 nm or less was 13.5% of the total pore volume, the total pore volume was 0.113 cm³/g and the specific surface area was 25.5 m²/g, a charge-discharge test was conducted at a current density of 20 mA/g under an environment of 25° C.

Example 4

Using a negative electrode containing, as a negative electrode active material, $TiO_2$ (B) having the characteristics that the average pore diameter was 9.1 nm, the volume of pores having a pore diameter of 10 nm or less was 27.0% of the total pore volume, the total pore volume was 0.0843 cm³/g and the specific surface area was 37.1 m²/g, a charge-discharge test was conducted at a current density of 20 mA/g under an environment of 25° C.

Example 5

Using a negative electrode containing, as a negative electrode active material, $TiO_2$ (B) having the characteristics that the average pore diameter was 24.16 nm, the volume of pores having a pore diameter of 10 nm or less was 10.4% of the total pore volume, the total pore volume was 0.1510 cm³/g and the specific surface area was 26.6 m²/g, a charge-discharge test was conducted at a current density of 20 mA/g under an environment of 25° C.

Comparative Example 1

Using a negative electrode containing, as a negative electrode active material, $TiO_2$ (B) having the characteristics that the average pore diameter was 12.1 nm, the volume of pores having a pore diameter of 10 nm or less was 30.4% of the total pore volume, the total pore volume was 0.864 cm³/g and the specific surface area was 284.2 m²/g, a charge-discharge test was conducted at a current density of 20 mA/g under an environment of 25° C.

Comparative Example 2

Using a negative electrode containing, as a negative electrode active material, $TiO_2$ (B) having the characteristics that the average pore diameter was 10.2 nm, the volume of pores having a pore diameter of 10 nm or less was 32.3% of the total pore volume, the total pore volume was 0.413 cm³/g and the specific surface area was 160.5 m²/g, a charge-discharge test was conducted at a current density of 20 mA/g under an environment of 25° C.

Comparative Example 3

Using a negative electrode containing, as a negative electrode active material, $TiO_2$ (B) having the characteristics that the average pore diameter was 6.01 nm, the volume of pores having a pore diameter of 10 nm or less was 39.1% of the total pore volume, the total pore volume was 0.0473 cm³/g and the specific surface area was 31.4 m²/g, a charge-discharge test was conducted at a current density of 20 mA/g under an environment of 25° C.

Comparative Example 4

Using a negative electrode containing, as a negative electrode active material, $TiO_2$ (B) having the characteristics that the average pore diameter was 25.4 nm, the volume of pores having a pore diameter of 10 nm or less was 8.6% of the total pore volume, the total pore volume was 0.4 cm³/g and the specific surface area was 63 m²/g, a charge-discharge test was conducted at a current density of 20 mA/g under an environment of 25° C.

Comparative Example 5

Using a negative electrode containing, as a negative electrode active material, $TiO_2$ (B) having the characteristics that the average pore diameter was 19.15 nm, the volume of pores having a pore diameter of 10 nm or less was 9.7% of the total pore volume, the total pore volume was 0.1100 cm³/g and the specific surface area was 23.0 m²/g, a charge-discharge test was conducted at a current density of 20 mA/g under an environment of 25° C.

Table 1 shows the average pore diameter, percentage of the volume of pores having a diameter of 10 nm or less in the total pore volume (indicated as the percentage of pores having a diameter of 10 nm or less in Table 1), total pore volume, specific surface area and results of each negative electrode active material obtained in Examples 1 to 5 and Comparative Examples 1 to 5. It is to be noted that the average pore diameter, percentage of pores having a diameter of 10 nm or less and total pore volume were measured by the above methods and the specific surface area was measured by the BET method.

TABLE 1

|  | Charge capacity mAh/g | Discharge capacity mAh/g | Efficiency % | Average pore diameter nm | Volume of pores having a diameter of 10 nm or less % | Total pore volume cm³/g | Specific surface area m²/g |
|---|---|---|---|---|---|---|---|
| Example 1 | 265.2 | 224.4 | 84.6 | 14.6 | 17.5 | 0.1220 | 33.5 |
| Example 2 | 271.3 | 222.3 | 81.9 | 12.34 | 22.9 | 0.0991 | 32.1 |
| Example 3 | 272.6 | 236.7 | 86.8 | 17.72 | 13.5 | 0.1130 | 25.5 |
| Example 4 | 288.6 | 233.3 | 80.8 | 9.1 | 27.0 | 0.0843 | 37.1 |
| Example 5 | 259.8 | 219.1 | 84.3 | 24.16 | 10.4 | 0.1510 | 26.6 |

TABLE 1-continued

|  | Charge capacity mAh/g | Discharge capacity mAh/g | Efficiency % | Average pore diameter nm | Volume of pores having a diameter of 10 nm or less % | Total pore volume cm³/g | Specific surface area m²/g |
|---|---|---|---|---|---|---|---|
| Comparative Example 1 | 319.6 | 222.0 | 69.5 | 12.1 | 30.4 | 0.8640 | 284.2 |
| Comparative Example 2 | 296.5 | 227.8 | 76.8 | 10.2 | 32.3 | 0.4130 | 160.5 |
| Comparative Example 3 | 277.5 | 206.0 | 72.3 | 6.01 | 39.1 | 0.0473 | 31.4 |
| Comparative Example 4 | 270.3 | 208.6 | 77.2 | 25.4 | 8.6 | 0.4000 | 63 |
| Comparative Example 5 | 240.2 | 199.1 | 82.9 | 19.15 | 9.7 | 0.1100 | 23 |

The average pore diameter of each negative electrode active material obtained in Examples 1, 2 and 3 and Comparative Examples 1 and 2 is in a range of about 10 to 18 nm. However, the active materials obtained in these examples are different from each other in the percentage of the volume of pores having a diameter of 10 nm or less in the total pore volume.

Although the negative electrode active materials obtained in Examples 1, 2 and 3 and Comparative Examples 1 and 2 each provide a discharge capacity as high as about 220 to 235 mAh/g, the negative electrode active materials obtained in Comparative Examples 1 and 2 each have the features that the volume of pores having a diameter of 10 nm or less is larger than 30% of the total pore volume, which allows an increase in the amount of decomposition reaction of the nonaqueous electrolyte at the boundary between the electrode and the electrolytic solution, resulting in reduced first cycle Coulomb efficiency. Also, it is also a cause of a low first cycle Coulomb efficiency that the specific surface area is as large as, for example, 284.2 m²/g in Comparative Example 1 and 160.5 m²/g in Comparative Example 2.

In Example 1, on the other hand, the volume of pores having a diameter of 10 nm or less is controlled to 17.5% of the total pore volume, to thereby obtain a first cycle Coulomb efficiency of 84.6%. Also, in Example 2, the volume of pores having a diameter of 10 nm or less is controlled to 22.9%, to thereby obtain a first cycle Coulomb efficiency of 81.9% and in Example 3, the volume of pores having a diameter of 10 nm or less is controlled to 13.5%, to thereby obtain a first cycle Coulomb efficiency of 86.8%.

From the results of Examples 4 and 5, it is found that when the average pore diameter is designed to be in the range of 8 to 25 nm and the percentage of pores having a diameter of 10 nm or less is designed to be 10% to 30%, a high discharge capacity and a high first cycle Coulomb efficiency can be obtained.

In Comparative Example 3, the average pore diameter is as small as 6.01 nm. This is because the specific surface area per unit volume of pores is excessive. Since the specific surface area per unit volume is excessive, the first cycle Coulomb efficiency is as low as 72.3%.

In Comparative Example 4, the average pore diameter is as large as 25.4 nm. This is because the total pore volume is excessively large. Since the total pore volume is excessive, a powder strength is lowered, making it difficult to manufacture an electrode. The results of the charge-discharge test show that the first cycle Coulomb efficiency is as low as 77.2%.

Comparative Example 5 is $TiO_2$ (B) obtained by carrying out the acid treatment and heat treatment in the same manner as in Example 1 except that a different raw material was used. In Comparative Example 5, microparticle-shape $K_2Ti_4O_9$ was used. In Comparative Example 5, the volume of pores having a diameter of 10 nm or less is as small as 9.7% of the total pore volume. Although the total pore volume is sufficient, it has a small contribution to an improvement in charge-discharge reaction because there are many pores having a large diameter, resulting in low discharge capacity.

A high discharge capacity and a high first cycle Coulomb efficiency can be obtained by controlling the pores of $TiO_2$ (B).

Figure 7:
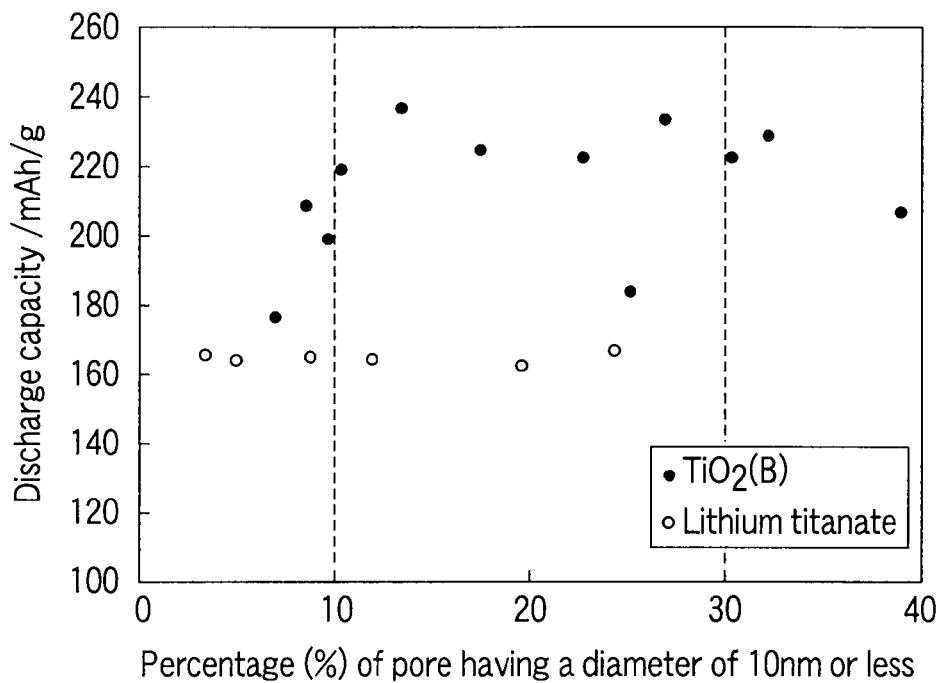
FIG. 7 is a graph showing the relation between the percentage of the volume of pores having a diameter of 10 nm or less and the discharge capacity.
Figure 8:
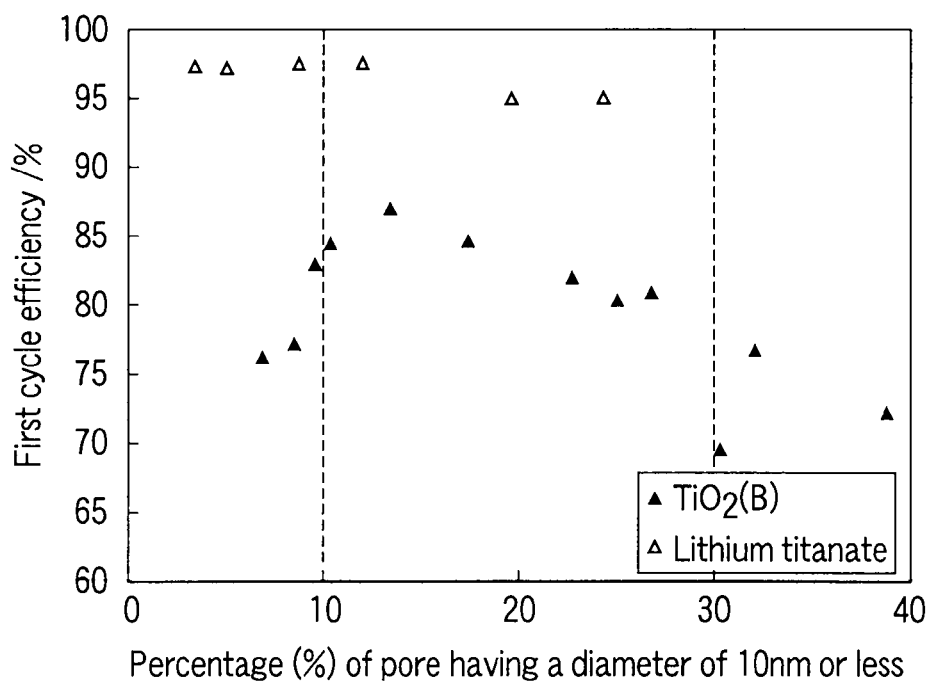
FIG. 8 is a graph showing the relation between the percentage of the volume of pores having a diameter of 10 nm or less and first cycle efficiency.

Then, the ratio of the volume of pores having a diameter of 10 nm or less in $TiO_2$ (B) (hereinafter referred to as "percentage of pores having a diameter of 10 nm or less") was varied between 7% to 39% to obtain the relation between the volume and the discharge capacity. The results are shown in FIG. 7 and also the relation between the volume and the first cycle Coulomb efficiency is shown in FIG. 8. FIG. 7 is a graph showing the relation between the percentage of the volume of pores having a diameter of 10 nm or less in the total pore volume, and the discharge capacity, in a negative electrode active material used in an example and lithium titanate. FIG. 8 is a graph showing the relation between the percentage of the volume of pores having a diameter of 10 nm or less in the total pore volume, and first cycle efficiency, in a negative electrode active material used in an example and lithium titanate. The discharge capacity and the first cycle Coulomb efficiency were measured using the above methods. FIGS. 7 and 8 show the results of lithium titanate, showing the relations between the volume and the discharge capacity and between the volume and the first cycle Coulomb efficiency when the percentage of pores having a diameter of 10 nm or less was varied between 4% and 24%. In this case, the average pore diameter, total pore volume and specific surface area of lithium titanate were 7 to 42.6 nm, 0.0044 to 0.1466 cm³/g and 2.55 to 44.84 m²/g, respectively.

From the relation between the percentage of pores having a diameter of 10 nm or less and the first cycle discharge capacity as shown in FIG. 7, it is found that a discharge capacity of 160 mAh/g or more which is close to a theoretical capacity is obtained from lithium titanate disclosed in JP-A 2007-18883 (KOKAI) regardless of the percentage of pores having a diameter of 10 nm or less. Namely, it is found that sufficient discharge capacity is obtained without controlling the condition of pores.

With regard to $TiO_2$ (B), a discharge capacity of about 180 mAh/g is obtained when the percentage of pores having a diameter of 10 nm or less is less than 10%, and a discharge capacity as high as 220 mAh/g is obtained when the percentage of pores having a diameter of 10 nm or less is 10% or more. Namely, it is understood that the discharge capacity is increased by forming many fine pores.

Also, from the relation between the percentage of pores having a diameter of 10 nm or less and the first cycle efficiency as shown in FIG. 8, it is found that lithium titanate disclosed in JP-A 2007-18883 (KOKAI) has a relatively high first cycle efficiency regardless of the percentage of pores having a diameter of 10 nm or less. However, when the percentage of pores having a diameter of 10 nm or less was increased to 20% or more, the first cycle efficiency was slightly reduced. It is considered that, in lithium titanate, the decomposition reaction of the nonaqueous electrolyte during charging is increased, from the fact that the first cycle efficiency was decreased to 95% though a discharge capacity of 160 mAh/g or more was obtained when the percentage of pores having a diameter of 10 nm or less was 20% or more. This fact shows that a high discharge capacity and first cycle efficiency are obtained from lithium titanate without controlling the reaction system in such a manner as to form fine pores.

In the case of $TiO_2$ (B), it is found that a first cycle efficiency as high as 80% or more is obtained when the percentage of pores having a diameter of 10 nm or less is 10% or more. However, when the percentage of pores having a diameter of 10 nm or less exceeds 30%, the first cycle efficiency is about 70 to 77%.

Specifically, in the case of $TiO_2$ (B), a high discharge capacity and first cycle efficiency can be attained by forming fine pores to some extent. Such an effect was found by the present inventors for the first time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. Negative electrode active material particles for a nonaqueous electrolyte battery consisting of:
monoclinic system titanium dioxide, each of the particles having pores, the pores having an average pore diameter falling within a range of 8 to 25 nm, 10 to 30% of a total volume of the entire pores being a total volume of a part of the pores having a diameter ranging from 1 nm to 10 nm, wherein the volume of pores is measured by a nitrogen gas adsorption method using a BJH method.

2. The active material particles according to claim 1, wherein the total volume of the entire pores is 0.02 cm$^3$/g or more.

3. The active material particles according to claim 1, wherein the total volume of the entire pores falls within a range of 0.02 to 0.2 cm$^3$/g.

4. The active material particles according to claim 1, wherein the average pore diameter falls within a range of 10 to 20 nm.

5. The active material particles according to claim 1, wherein a specific surface area of the monoclinic system titanium dioxide falls within a range of 5 to 100 m$^2$/g.

6. The active material particles according to claim 1, wherein the monoclinic system titanium dioxide has a monoclinic system β-type structure.

7. The active material particles according to claim 1, wherein the monoclinic system titanium dioxide is $TiO_2$ (B).

8. The active material particles according to claim 1, wherein the monoclinic system titanium dioxide has an average particle diameter falling within a range of 1 to 10 μm.

9. A nonaqueous electrolyte battery comprising:
a negative electrode comprising a negative electrode active material particles consisting of monoclinic system titanium dioxide, each of the particles having pores, the pores having an average pore diameter falling within a range of 8 to 25 nm, 10 to 30% of a total volume of the entire pores being a total volume of a part of the pores, having a diameter ranging from 1 nm to 10 nm, wherein the volume of pores is measured by a nitrogen gas adsorption method using a BJH method;
a positive electrode; and
a nonaqueous electrolyte.

10. The battery according to claim 9, wherein the positive electrode comprises a lithium-nickel composite oxide and/or a lithium-manganese composite oxide.

11. The battery according to claim 9, wherein the total volume of the entire pores is 0.02 cm$^3$/g or more.

12. The battery according to claim 9, wherein the total volume of the entire pores falls within a range of 0.02 to 0.2 cm$^3$/g.

13. The battery according to claim 9, wherein the average pore diameter falls within a range of 10 to 20 nm.

14. The battery according to claim 9, wherein a specific surface area of the monoclinic system titanium dioxide falls within a range of 5 to 100 m$^2$/g.

15. The battery according to claim 9, wherein the monoclinic system titanium dioxide has a monoclinic system β-type structure.

16. The battery according to claim 9, wherein the monoclinic system titanium dioxide is $TiO_2$ (B).

17. The battery according to claim 9, wherein the monoclinic system titanium dioxide has an average particle diameter falling within a range of 1 to 10 μm.

18. A battery pack comprising the nonaqueous electrolyte battery according to claim 9.

* * * * *